US012129688B2

(12) United States Patent
Reddmann

(10) Patent No.: US 12,129,688 B2
(45) Date of Patent: Oct. 29, 2024

(54) DOOR HOLDER FOR A MOTOR VEHICLE

(71) Applicant: Kiekert AG, Heiligenhaus (DE)

(72) Inventor: Uwe Reddmann, Essen (DE)

(73) Assignee: Kiekert AG, Heiligenhaus (DE)

( * ) Notice: Subject to any disclaimer, the term of this patent is extended or adjusted under 35 U.S.C. 154(b) by 219 days.

(21) Appl. No.: 17/995,590

(22) PCT Filed: Feb. 15, 2021

(86) PCT No.: PCT/DE2021/100147
§ 371 (c)(1),
(2) Date: Oct. 6, 2022

(87) PCT Pub. No.: WO2021/204318
PCT Pub. Date: Oct. 14, 2021

(65) Prior Publication Data

US 2023/0160238 A1 May 25, 2023

(30) Foreign Application Priority Data

Apr. 8, 2020 (DE) .................... 10 2020 109 770.0

(51) Int. Cl.
*E05B 77/38* (2014.01)
*E05B 81/04* (2014.01)
*E05B 83/36* (2014.01)

(52) U.S. Cl.
CPC .............. *E05B 77/38* (2013.01); *E05B 81/04* (2013.01); *E05B 83/36* (2013.01)

(58) Field of Classification Search
CPC .......... E05B 77/00; E05B 77/36; E05B 77/38; E05B 77/40; E05B 81/00; E05B 81/02;
(Continued)

(56) References Cited

U.S. PATENT DOCUMENTS 8,534,745 B1 * 9/2013 Quinn ..................... E05B 77/38
292/DIG. 3
2016/0349908 A1 * 12/2016 Sugiura .................. E05B 81/64
(Continued)

FOREIGN PATENT DOCUMENTS

DE 19700887 A1 7/1998
DE 102010005843 A1 7/2011
(Continued)

OTHER PUBLICATIONS

International Search Report mailed Jul. 27, 2021, for priority International Patent Application No. PCT/DE2021/100147.

*Primary Examiner* — Nathan Cumar
(74) *Attorney, Agent, or Firm* — Renner, Otto, Boisselle & Sklar, LLP

(57) ABSTRACT

A motor vehicle closing device having a locking mechanism with a catch; at least one pawl, said catch being latchable in at least one latching position by means of the pawl; a lock holder, wherein the lock holder can be brought into engagement with the catch by means of a relative movement between the closing device and the lock holder, and the locking mechanism can be converted into a latching position; and means for locking the lock holder in a main latching position of the locking mechanism. According to the invention, a holding device is provided. The holding device is used to convert a vehicle part which interacts with the motor vehicle closing device from a closed position into an open position, and the holding device forms at least one part of the means for locking the lock holder.

10 Claims, 1 Drawing Sheet

(58) Field of Classification Search
CPC .......... E05B 81/04; E05B 81/05; E05B 81/06; E05B 81/08; E05B 83/00; E05B 83/36; E05B 83/363; E05B 83/367
USPC .......................................................... 70/278.7
See application file for complete search history.

(56) References Cited

U.S. PATENT DOCUMENTS

| | | | | |
|---|---|---|---|---|
| 2018/0044950 | A1* | 2/2018 | Distefano | E05B 85/26 |
| 2018/0320418 | A1* | 11/2018 | Berghahn | E05B 83/18 |
| 2019/0359090 | A1* | 11/2019 | Robertson | E05B 77/38 |

FOREIGN PATENT DOCUMENTS

| | | | |
|---|---|---|---|
| DE | 102011015669 | A1 | 10/2012 |
| DE | 102011107877 | A1 | 1/2013 |
| DE | 102017124282 | A1 | 4/2019 |
| DE | 102018101073 | A1 | 7/2019 |
| WO | WO-2010034295 | A1 * | 4/2010 |

* cited by examiner

DOOR HOLDER FOR A MOTOR VEHICLE

This application is a national phase of International Patent Application No. PCT/DE2021/100147 filed Feb. 15, 2021, which claims priority to German Patent Application No. 10 2020 109 770.0 filed Apr. 8, 2020, each of which is hereby incorporated herein by reference in its entirety.

FIELD OF DISCLOSURE

The invention relates to a motor vehicle closing device having a locking mechanism with a catch and at least one pawl, wherein the catch can be latched in at least one latching position by means of the pawl, a lock holder, wherein the lock holder can be brought into engagement with the catch by means of a relative movement between the closing device and the lock holder, and the locking mechanism can be converted into a latching position, and means for locking the lock holder in a main latching position of the locking mechanism.

BACKGROUND OF DISCLOSURE

Motor vehicle closing devices are used where vehicle parts that are attached to the motor vehicle in a pivoting or sliding manner have to be held in a mostly closed position. The vehicle parts must maintain their position while the vehicle is in motion and protect the occupant, for example, in the event of an accident in the motor vehicle.

To increase comfort in motor vehicles and/or due to the design on the motor vehicle, more and more electrically assisted closing devices are being used. For example, an electrically operated latch can be used when an exterior door handle is not required. In this case, the operator can open the motor vehicle by giving a switching signal to the closing device. It can then be advantageous to provide the closing device or the movable component with a holder. Holding a side door can make it easier to get into vehicles without door handles, for example. Such holding devices are also called door holders or positioning devices.

DE 10 2011 015 669 A1 describes a holding device for motor vehicle doors or hatches by means of which a door, hatch or hood can be converted from a closed position to an open position. For example, if the holding device relates to a motor vehicle side door, the door can be opened by the operator by means of an electrical signal. To do this, the locking mechanism of the door lock must first be electrically unlocked so that the door can be opened. The door can then be converted to an open position by means of the holding device. An open position is defined here in such a way that the operator of the motor vehicle is able to grasp the door so that they can fully open the door. The holding apparatus used here is an electric drive that acts mechanically on the motor vehicle door via a drive pawl and an inner and outer lever in the form of a pivoting movement of the levers.

From DE 10 2017 124 282 A1 an opening apparatus for a motor vehicle door element has become known, having an electric drive and an actuating means, wherein the actuating means can be adjusted by means of the drive and a transmission arranged between the actuating means and the drive. The door can be moved by means of the holding device, wherein a sliding element is arranged on the actuating element, which interacts with a switching means so that the door can be detected. The actuating means is substantially formed from a driven toothed rack having an integrated sliding element, switching means and electrical supply line.

It is possible to control the movement of the driven toothed rack by means of the switching means between the sliding element and the body.

The motor vehicle closing devices according to the invention have a locking mechanism comprising a catch and a pawl. The catch is rotatably or pivotably accommodated in the closing device and can be held in at least one latching position, i.e. locked, by means of the pawl. In most cases, the closing device is arranged in the vehicle part that is pivotably arranged on the motor vehicle, as is common, for example, for side doors. Of course, the closing device can also be arranged on the body, for example. The closing device interacts with a lock holder, which is attached to the body, for example, and may be designed as a lock holder bracket or bolt. The relative movement between the closing device and the lock holder causes the catch to pivot and to be held or secured in a pre-latching position and/or a main latching position by means of the pawl.

Now, when the motor vehicle is in motion, there are usually movements in the body and relative movements between the vehicle part that is pivotally arranged on the body, which in turn results in relative movements between the catch and the lock holder. These relative movements between the lock holder and the catch can cause noises, also known as creaking. In order to influence and, above all, reduce the noise behavior between the lock holder and the closing device, damping means are used, also known as stop buffers or insertion buffers. Various possibilities for influencing the noise behavior between the closing device and the lock holder have become known from the prior art.

DE 10 2010 005 843 A1 discloses an insertion buffer made of a rubber-elastic material that interacts with the lock holder in the main latching position. The insertion buffer serves on the one hand to reduce the noise when the lock holder strikes the locking device and at the same time to guide the lock holder in the locking system during travel. In accordance with this document, the insertion buffer additionally has an insert formed from an inelastic material, in this case a polyoxymethylene (POM). The insert placed on the rubber-elastic buffer allows the lock holder to nestle without overloading the buffer.

From DE 10 2011 107 877 A1, a lock for a door of a motor vehicle has become known, wherein a spring plate oriented substantially parallel to the catch is arranged in the lock, wherein the spring plate comprises the lock holder in the main latching position of the lock. The spring plate is intended to prevent creaking in the area where the lock is connected to the body. In addition to the damping means known from the prior art, this spring plate absorbs possible movements of the corresponding door or hatch perpendicular to the direction of travel of a motor vehicle. A direction perpendicular to the direction of travel is also referred to as the Z direction in a coordinate system referenced to the motor vehicle.

The solutions known from the state of the art have proven themselves in principle, but reach their limits where there is little space to implement the above-mentioned functions, in particular the holding function, due to the installation space available. This is where the invention aims to remedy the situation.

SUMMARY OF DISCLOSURE

The object of the invention is to provide a motor vehicle closing device that realizes a holding function in the motor vehicle with the smallest possible installation space and at the same time enables low-noise interaction between the closing device and the lock holder. Finally, the object of the invention is that of providing a structurally simple and inexpensive solution.

The object is achieved by the features of the independent claim 1. Advantageous forms of the invention are indicated in the subclaims. It should be noted that the exemplary embodiments described below are not restrictive; rather, any variation of the characteristics described in the description and subclaims is possible.

In accordance with claim 1, the object of the invention is solved by providing a motor vehicle closing device having a locking mechanism with a catch and at least one pawl, wherein the catch can be latched in at least one latching position by means of the pawl, a lock holder, wherein the lock holder can be brought into engagement with the catch by means of a relative movement between the closing device and the lock holder and the lock holder can be converted into a latching position, and a means for locking the lock holder in a main latching position of the catch, wherein the motor vehicle closing device further has a holding device, wherein by means of the holding device a vehicle part interacting with the motor vehicle closing device can be converted from a closed position into an open position and the holding device forms at least one part of the means for locking the lock holder. The design of the motor vehicle closing device according to the invention now makes it possible to use the holding device as a means for locking the lock holder in the main latching position. This can minimize the number of parts needed to lock, i.e. hold in the main latching position, the lock holder. In particular, at least parts of the insertion buffer, with or without insert, can be dispensed with. The object of locking the lock holder in the main latching position can be taken over by the holding device. The holding device thus has a multifunction. On the one hand, the vehicle part arranged movably on the motor vehicle can be moved by means of the holding device, and, on the other hand, the holding device can be used to fix in place the lock holder or hold the lock holder in the main latching position with low noise.

When referring to a motor vehicle closing device according to the invention, terms such as motor vehicle lock, lock or locking system are also common designations for a motor vehicle closing device, which are used as synonyms in motor vehicle technology. All these closing devices have in common that a locking mechanism is used in which a pivoting or rotating catch arranged in the locking mechanism interacts with at least one pawl. The catch and pawl are mounted on metal bolts in a metal lock plate so that even the highest loads, such as those that occur in the event of an accident, can be absorbed. In some cases, reinforcing plates are still used between the axles to stabilize the locking mechanism parts. The pawl allows the locking mechanism to assume a pre-latching position and/or a main latching position. One pawl can be used to lock the locking mechanism in two latching positions, but it is also conceivable to use two pawls for the latching positions. It is also conceivable and known that two pawls are used which engage with one another and thereby facilitate unlocking of the locking mechanism; these locking mechanisms are also referred to as two-pawl locking mechanisms.

The lock holder is usually attached to the body and interacts with the locking mechanism through the movement of the closing device in the vehicle part of the motor vehicle that can be moved. The relative movement between the closing device and the lock holder allows the locking mechanism to be converted into the latching positions. The relative movement between the closing device and the lock holder results in a noise, which can be reduced by the means for locking the lock holder. The means for locking can be formed by a plastic damping element with or without an insert. According to the invention, the means for locking is formed by the holding device.

In an advantageous variant of an embodiment of the invention, the holding device has a holder, wherein the holder engages around the lock holder at least in certain areas. By means of engaging around the lock holder, it is possible to fix in place the lock holder in the Z direction. The holding device is mechanically driven, wherein the holder can be guided in the closing device. By guiding the holder through the mechanics of the holding device, a means for locking the lock holder in the closing device can be provided. The holder engages around the lock holder at least to such an extent that it can be guided or held in the Z direction.

Furthermore, it can be advantageous if the holder can be guided in the closing device, in particular by means of a mechanism of the holding device and/or the closing device. Guiding the holder allows the lock holder to be guided in the latching positions as well as beyond the latching positions. As a result, safe movement of the movable component, and in particular a side door, can be ensured. The holder can be guided by the holding device itself and/or by means of, for example, a guide track in the motor vehicle lock. Components present in the motor vehicle closing device, such as the lock plate, the reinforcing plate and/or a housing of the closing device, can be used for this purpose.

If the holder has a damping means, a further variant of an embodiment of the invention results. If the holder is equipped with damping means, for example a rubber-elastic material, the holder can additionally dampen the closing noise when the lock holder engages. In particular, it is conceivable in this context that the holder is overmolded with a rubber-elastic material, so that a one-piece structure of the holder with the damping means is achievable. This ensures high long-term stability and easy assembly.

In a further development of the invention, the damping means on the holder can be designed as a stop buffer. In this embodiment variant, the holder or the holding device assumes the function of the insertion buffer. This means that there is no need for an additional insertion buffer in the motor vehicle lock. The damping means can be connected as a separate part to the holder, for example by positive locking, or can be molded onto the holder. The integrated or attached stop buffer then interacts with the lock holder in the main latching position of the locking mechanism and can prevent creaking. The lock holder is accommodated in the stop buffer in such a manner that a movement of the lock holder is damped by means of the stop buffer and thus kept at a low noise level. The stop buffer can then simultaneously serve as a guide when holding the motor vehicle door, for example. As a result, this simultaneously provides a damping means for guiding or holding the movable vehicle part.

In a further embodiment of the invention, the damping means is provided with a U-shaped protective shell. The protective shell can be designed as a spring element and accommodate the lock holder in a form-fitting manner, or can be made of a higher-strength material that ensures additional positional security and long-term stability of the damping means. Particularly when the damping means serves as a stop buffer, an additional protective shell can improve the long-term stability of the damping means on the holder. In this context, higher strength materials means that the damping means is formed from a combination of a rubber-elastic material and a material that has a higher strength than the rubber-elastic material. This can be a higher-strength plastic, but also a metallic material. Of course, it is also conceivable that a hybrid protective shell is used, consisting, for example, of a metallic shell with plastic overlays in at least some areas. The protective shell can minimize the noise from the interaction between the lock holder and the holder, and at the same time ensure high long-term stability.

If the holder is designed as a lever, this results in a further advantageous variant of an embodiment of the invention. The design of the holder as a lever, wherein the lever is part of the holding device, offers the possibility of introducing high forces into the lock holder. In addition, a lever can be easily guided in the motor vehicle lock or the closing device. A lever mechanism can also be easily integrated into the motor vehicle closing device, since, for example, the locking mechanism has axles on which the holder or at least parts of the holder device can be mounted. The movable vehicle part, for example a door, hatch or hood, can be arrangeable by means of the holder. In the process, the vehicle parts or the vehicle part are guided by means of the holder and held in the closed position by means of the holder. This means that there is no need for further damping means or locking means in addition to the holder. This reduces the number of components required in the motor vehicle, which in turn has a beneficial effect on the cost and assembly of the closing device.

In an advantageous manner, the holding device can be driven electrically, wherein the drive device for the holding device can be a direct part of the closing device, can be adapted to the closing device and/or is arranged in the motor vehicle as a separate pulling shut module at a distance from the closing device. It is also conceivable, for example, that the holder can be operated directly or indirectly by means of a Bowden cable. An electrical operation offers the advantage that a power supply is available in the motor vehicle in a variety of ways. By means of a lever mechanism, which can be driven by the drive device, on the one hand sufficient force can be provided for holding the component upright and, on the other hand, the paths or holding movements of the movable component can be adjusted. The distance the movable vehicle part travels from the closed position to an open position is referred to as the holding distance.

The holder engages around the lock holder in such a manner that it can be fixed in place in the Z direction. In this case, the holder can extend along the lock holder so that a required face for absorbing the surcharge pulse can be provided. In addition, it is also conceivable that possible support in the closing device can be provided for the holder by extending the holder along the lock holder. In other words, a lever for operating the holder can be connected to the holder only in certain areas, wherein the holder and/or the damping means extend along the lock holder, wherein the holder and/or the damping means can be supported or accommodated in the lock housing and/or the lock plate and/or the reinforcing plate, for example.

By using the structure of the holding device according to the invention, a low-noise interaction between the lock holder and the closing device can be ensured, wherein at the same time the smallest possible installation space is occupied by the closing system. Due to the dual function of the holder as a part of the holding device and at the same time as a damping means, the number of components required can be reduced and the space gained can be used advantageously for the additional function of steepening.

BRIEF DESCRIPTION OF DRAWINGS

The invention is explained in more detail below with reference to the attached drawings on the basis of a preferred exemplary embodiment. However, the principle applies that the exemplary embodiment does not limit the invention, but merely represents an advantageous embodiment. The features shown can be implemented individually or in combination with further features of the description as well as the claims—individually or in combination.

In the drawings.

DETAILED DESCRIPTION

Figure 1:
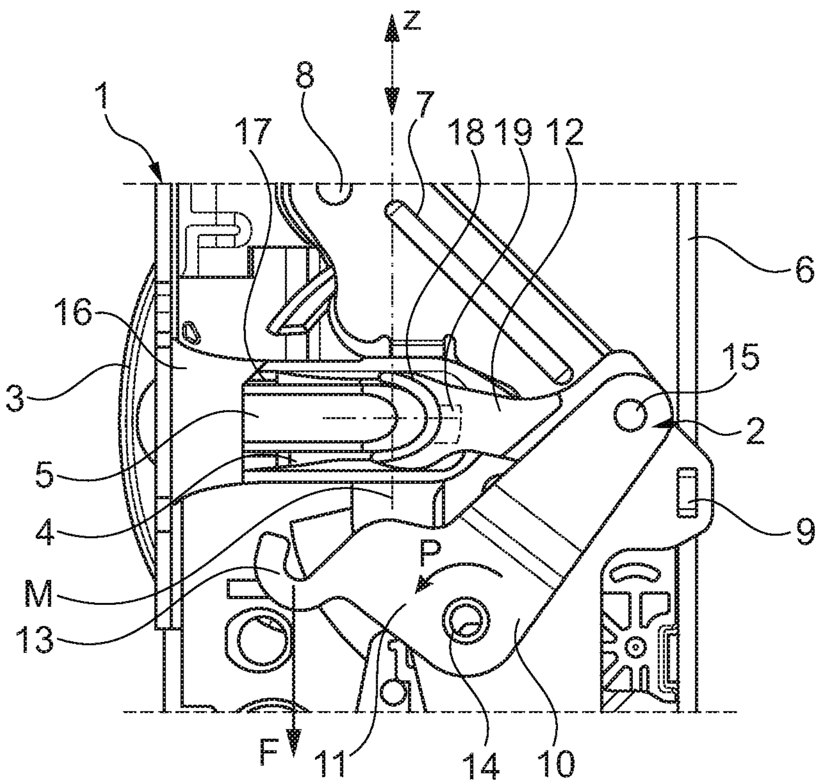
FIG. 1 is a side view of a locking system in a main latching position with a holding device shown in areas and an engaged lock holder.

FIG. 1 shows a side view of a motor vehicle closing device 1 and a holding device 2. The closing device 1 interacts with a lock holder 3. In this respect, a main latching position of the closing device 1 is shown, i.e. the movable component is in a closed position. The lock holder 3 is held in the main latching position of the locking mechanism by means of the catch. The lock holder 3 is provided with a lock holder bracket 5, wherein the catch 4 engages around an area of the lock holder bracket 5, thus securing the movable component.

In this exemplary embodiment, the motor vehicle closing device 1 has a U-shaped lock plate 6, in which at least the locking mechanism parts 4 are accommodated in a rotatably mounted manner. In addition, a reinforcement plate 7 can be seen, which on the one hand is connected to the reinforcement plate 7 by means of a bolt 8 and a receptacle 9. On the other hand, a part of the lever mechanism 10 of the holding device 2 is pivotably accommodated on the reinforcing plate 7. In this exemplary embodiment, the lever mechanism 10 comprises an operating lever 11 and a holder 12. The operating lever 11 has a suspension 13 into which, for example, one end of a Bowden cable not shown can be suspended. By means of the Bowden cable, a force F can be introduced into the lever mechanism 10 so that the operating lever 11 moves around the axle 14 in the direction of the arrow P, so that a force can be introduced into the holder 12. The lock plate 6, reinforcing plate 7, operating lever 11 and holder 12 are preferably made of a metallic material so that even high holding forces can be introduced into the lock holder 3. The holder 12 and operating lever 11 are pivotably connected to one another about an axle 15.

FIG. 1 also shows a part of the lock housing 16, wherein the lock housing 16 forms an insertion area 17 for the lock holder 3.

In this embodiment variant, the holder 12 additionally assumes the function of an insertion buffer. In this exemplary embodiment, the insertion buffer 18 is formed integrally with the holder 12 and may, for example, be molded onto the holder 12 in the form of a rubber-elastic plastic. It is of course also conceivable that the rubber-elastic insertion buffer is connected to the holder 12 by means of a form fit 19. The form fit 19 is shown as a dashed line in FIG. 1 by way of example. Together with the holder 12, the insertion buffer forms the damping means 12, 18 with which the lock holder 3 can be inserted into the motor vehicle closing device 1 in a noise-damped manner. As can be clearly seen in FIG. 1, the ends of the insertion buffer 18 and the holder 12, respectively, extend beyond a centerline M of one end of the lock holder bracket 5. This ensures that a load in the Z direction can be applied to the lock holder 3 by means of the receptacle 12. The lock holder bracket 5 can thus be locked in the closing device 1 by means of the holder 12 and the insertion buffer 13. The holder 12 can be guided in the closing device 1 and, for example, through the lock housing 16 and/or the reinforcing plate 7.

Figure 2:
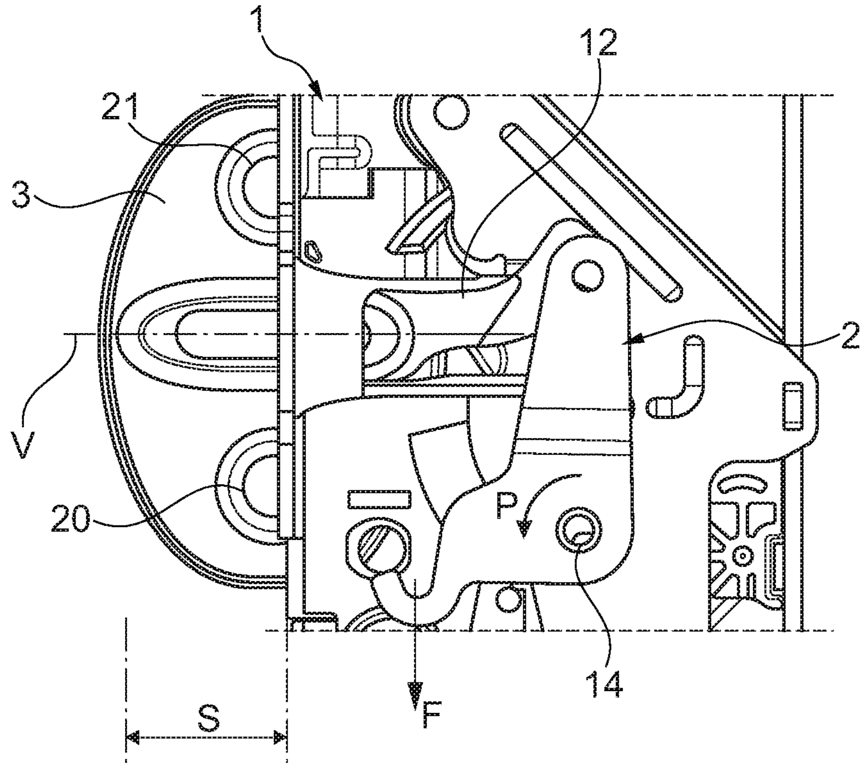
FIG. 2 also shows a side view of a closing system shown in areas with a holding device, wherein the holding device is shown in an open position of the movable vehicle part.

FIG. 2 now shows the position of the holding device 2 in which a relative movement between the lock holder 3 and the motor vehicle closing device 1 has taken place. By means of a force F, which was introduced into the holding device 2, for example, via an electric drive and by means of a Bowden cable, the operating lever 11 was pivoted around the axle 14, allowing the holder 12 to exert a force in the direction of the lock holder 3. If, for example, the motor vehicle closing device 1 is now integrated in a side door of a motor vehicle, the motor vehicle door has been moved over the distance S by means of the holder 12 or the holding device 2 and brought into an open position. The movement can be clearly seen from the fact that the assembly openings 20, 21 of the lock holder 3 are now visible. The lock holder 3 can be mounted on a B-pillar of a motor vehicle, for example. However, it can also be seen in FIG. 2 that a linear movement has taken place along a travel distance V by means of the holder 12. For this purpose, the holder 12 can be guided linearly through the lock housing 16, for example, wherein at the same time the lifting mechanism 10 performs pivoting movements. The design of the closing device 1 according to the invention now makes it possible to dispense with a means for locking in the closing device 1 itself, since a means for locking 12, 18 can be provided by the holding device 2. The holding device 2 thus assumes a dual function, wherein, on the one hand, it can be locked in the main latching position and, on the other hand, it enables the movable vehicle part to be hold up. In particular, guiding the lock holder 3 along the complete holding distance S allows the lock holder to be locked in a pre-latching position as well.

LIST OF REFERENCE SIGNS

1 Motor vehicle closing device
2 Holding device
3 Lock holder
4 Catch
5 Lock holder bracket
6 Lock plate
7 Reinforcement plate
8 Bolt
9 Receptacle
10 Lever mechanism
11 Operating lever
12 Holder
13 Suspension
14, 15 Axle
16 Lock housing
17 Insertion area
18 Insertion buffer, damping means
19 Form fit
20, 21 Assembly opening
F Force
P Arrow
M Centerline
Z Direction
S Holding distance
V Travel distance

The invention claimed is:

1. A motor vehicle closing device comprising:
a locking mechanism with a catch and at least one pawl, wherein the catch is latched in at least one latching position by the pawl,
a lock holder, wherein the lock holder, by a relative movement between the closing device and the lock holder, is brought into engagement with the catch and the locking mechanism is converted into a latching position, and
a means for locking the lock holder in a main latching position of the locking mechanism, and
a holding device, wherein by the holding device a vehicle part interacting with the closing device is converted from a closed position into an open position, and the holding device forms at least one part of the means for locking the lock holder,
wherein the holding device has a holder,
wherein the holder has a damper,
wherein the lock holder is held by the damper,
wherein the holder engages around the lock holder at least in certain areas,
wherein the vehicle part is arrangeable by the holder, and
wherein the holding device is driven electrically.

2. The motor vehicle closing device according to claim 1, wherein the holding device is guided in the closing device by operation of at least one of the holding device and/or the closing device.

3. The motor vehicle closing device according to claim 1, wherein damper is designed as a stop buffer.

4. The motor vehicle closing device according to claim 1, wherein the damper has a U-shaped protective shell.

5. The motor vehicle closing device according to claim 4, wherein the lock holder is locked by the protective shell.

6. The motor vehicle closing device according to claim 4, wherein the protective shell is a spring element that is accommodated in the lock holder in a form fitting manner.

7. The motor vehicle closing device according to claim 4, wherein the protective shell comprises a metallic shell with a plastic overlay that overlays at least a portion of the metallic shell.

8. The motor vehicle closing device according to claim 1, wherein the holder is designed as a lever.

9. The motor vehicle closing device according to claim 1, wherein the damper is made of a rubber-elastic material.

10. The motor vehicle closing device according to claim 9, wherein the holder is over-molded with the rubber-elastic material.

* * * * *